US012673664B2

(12) United States Patent
Yamanouchi

(10) Patent No.: US 12,673,664 B2
(45) Date of Patent: Jul. 7, 2026

(54) HYBRID VEHICLE CONTROL METHOD AND HYBRID VEHICLE CONTROL DEVICE FOR HEATING CATALYTIC CONVERTER

(71) Applicant: Nissan Motor Co., Ltd., Yokohama (JP)

(72) Inventor: Akira Yamanouchi, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 207 days.

(21) Appl. No.: 17/997,128

(22) PCT Filed: May 18, 2020

(86) PCT No.: PCT/JP2020/019566

§ 371 (c)(1),
(2) Date: Oct. 26, 2022

(87) PCT Pub. No.: WO2021/234758

PCT Pub. Date: Nov. 25, 2021

(65) Prior Publication Data

US 2023/0219557 A1      Jul. 13, 2023

(51) Int. Cl.
B60K 6/46 (2007.10)
B60K 6/442 (2007.10)
(Continued)

(52) U.S. Cl.
CPC ............. B60W 20/15 (2016.01); B60K 6/442 (2013.01); B60K 6/46 (2013.01); B60W 10/06 (2013.01);
(Continued)

(58) Field of Classification Search
CPC ...... B60W 20/15; B60W 10/06; B60W 10/08; B60W 10/26; B60W 2510/244;
(Continued)

(56) References Cited

U.S. PATENT DOCUMENTS 5,461,289 A * 10/1995 Adler ................... F02D 11/105
318/152
9,970,364 B2    5/2018 Yokoyama et al.
(Continued)

FOREIGN PATENT DOCUMENTS

JP          16-129242 A      5/1994
JP          H10288028 A  * 10/1998
(Continued)

OTHER PUBLICATIONS

Communication pursuant to Article 94(3) EPC received for European Application No. 20937076.6, mailed on Apr. 14, 2025, 6 pages.

*Primary Examiner* — Jelani A Smith
*Assistant Examiner* — George A Alcorn, III
(74) *Attorney, Agent, or Firm* — Spencer Fane LLP

(57)      ABSTRACT

When a manifold catalytic converter, which is a catalyst above an exhaust passage, is warmed, a control unit is configured to control the energization of an electric heater of the manifold catalytic converter, and/or the driving of an internal combustion engine in accordance with a battery SOC of a battery. This makes it possible in a hybrid vehicle to warm the manifold catalytic converter using an amount of electric power consumed by motoring of an electric motor, and generally to shorten a time taken to drive the internal combustion engine for catalyst warming.

4 Claims, 3 Drawing Sheets

(51) Int. Cl.

| | |
|---|---|
| *B60W 10/06* | (2006.01) |
| *B60W 10/08* | (2006.01) |
| *B60W 10/26* | (2006.01) |
| *B60W 10/30* | (2006.01) |
| *B60W 20/13* | (2016.01) |
| *B60W 20/15* | (2016.01) |
| *B60W 20/16* | (2016.01) |
| *B60K 6/26* | (2007.10) |

(52) U.S. Cl.

CPC ............ *B60W 10/08* (2013.01); *B60W 10/26* (2013.01); *B60K 2006/268* (2013.01); *B60W 2510/244* (2013.01); *B60W 2530/12* (2013.01)

(58) Field of Classification Search

CPC ......... B60W 2530/12; B60W 2710/30; B60W 2710/305; B60W 10/30; B60W 20/16; B60K 6/442; B60K 6/46; B60K 2006/268; Y02A 50/20; Y02T 10/62

USPC .......................................................... 701/22

See application file for complete search history.

(56) References Cited

U.S. PATENT DOCUMENTS

| | | | | |
|---|---|---|---|---|
| 2002/0123831 A1* | 9/2002 | Nakagawa | .......... | F02N 11/0814 |
| | | | | 903/917 |
| 2011/0120789 A1* | 5/2011 | Teraya | ................... | B60L 50/16 |
| | | | | 180/65.265 |
| 2013/0297138 A1* | 11/2013 | Fushiki | ................. | B60W 10/08 |
| | | | | 180/65.265 |
| 2022/0001851 A1* | 1/2022 | Namba | ................... | F02D 15/02 |

FOREIGN PATENT DOCUMENTS

| | | | | | |
|---|---|---|---|---|---|
| JP | H11-210448 | A | | 8/1999 | |
| JP | 2002256919 | A | * | 9/2002 | ............. B60K 13/04 |
| JP | 3376902 | B2 | | 2/2003 | |
| JP | 3575184 | B2 | | 10/2004 | |
| JP | 2010-125906 | A | | 6/2010 | |
| JP | 2011011647 | A | * | 1/2011 | |
| JP | 2013-075547 | A | | 4/2013 | |
| JP | 2013-112320 | A | | 6/2013 | |
| JP | 2015-202832 | A | | 11/2015 | |

* cited by examiner

HYBRID VEHICLE CONTROL METHOD AND HYBRID VEHICLE CONTROL DEVICE FOR HEATING CATALYTIC CONVERTER

CROSS-REFERENCE TO RELATED APPLICATIONS

This application is a U.S. national stage application of International Application No. PCT/JP2020/019566, filed on May 18, 2020.

BACKGROUND

Technical Field

The present invention relates to a method and device for controlling a hybrid vehicle.

Background Technology

For example, Japanese Patent Application No. 6-129242 (Patent Document 1) discloses a configuration in which an electric heater-equipped catalytic converter (EHC) that can be heated by being energized is placed in individual exhaust systems of left and right banks of a V-type internal combustion engine. The electric heater-equipped catalytic converters are electrically connected in parallel to a battery, and are energized with electricity from the battery when the V-type internal combustion engine is cold-started.

In Patent Document 1, when a voltage of the battery decreases, a load on the battery is reduced by interrupting energizing of the electric heater-equipped catalytic converter of the two electric heater-equipped catalytic converters that has a relatively higher temperature of introduced exhaust gas, and allowing energizing of the other electric heater-equipped catalytic converter.

In Patent Document 1, when the electric heater-equipped catalytic converters are energized, electrical energy of the battery is consumed accordingly. In other words, in Patent Document 1, it is necessary to drive the internal combustion engine to generate electric power later in order to replenish the electrical energy consumed by the electric heater-equipped catalytic converters, and there is a risk that fuel consumption will generally decline.

In other words, in Patent Document 1, there is room for further improvement in terms of minimizing any decline in fuel consumption when warming up the electric heater-equipped catalytic converters.

SUMMARY

In a hybrid vehicle of the present invention, when a catalyst temperature of an electrically heated catalytic converter provided in an exhaust passage of an internal combustion engine falls to or below a predetermined temperature while the hybrid vehicle is traveling, energizing of the electrically heated catalytic converter and driving of the internal combustion engine are controlled in accordance with a battery SOC of a battery in order to raise the temperature of the electrically heated catalytic converter.

It is thereby possible in the hybrid vehicle of the present invention to warm up the electrically heated catalytic converter using an amount of power consumed by motoring, and to reduce driving time of the internal combustion engine for catalyst warmup and generally minimize worsening of fuel consumption in the vehicle.

BRIEF DESCRIPTION OF THE DRAWINGS

Referring now to the attached drawings which form a part of this original disclosure.

DETAILED DESCRIPTION OF EMBODIMENTS

One embodiment of the present invention is described in detail below with reference to the drawings.

Figure 1:
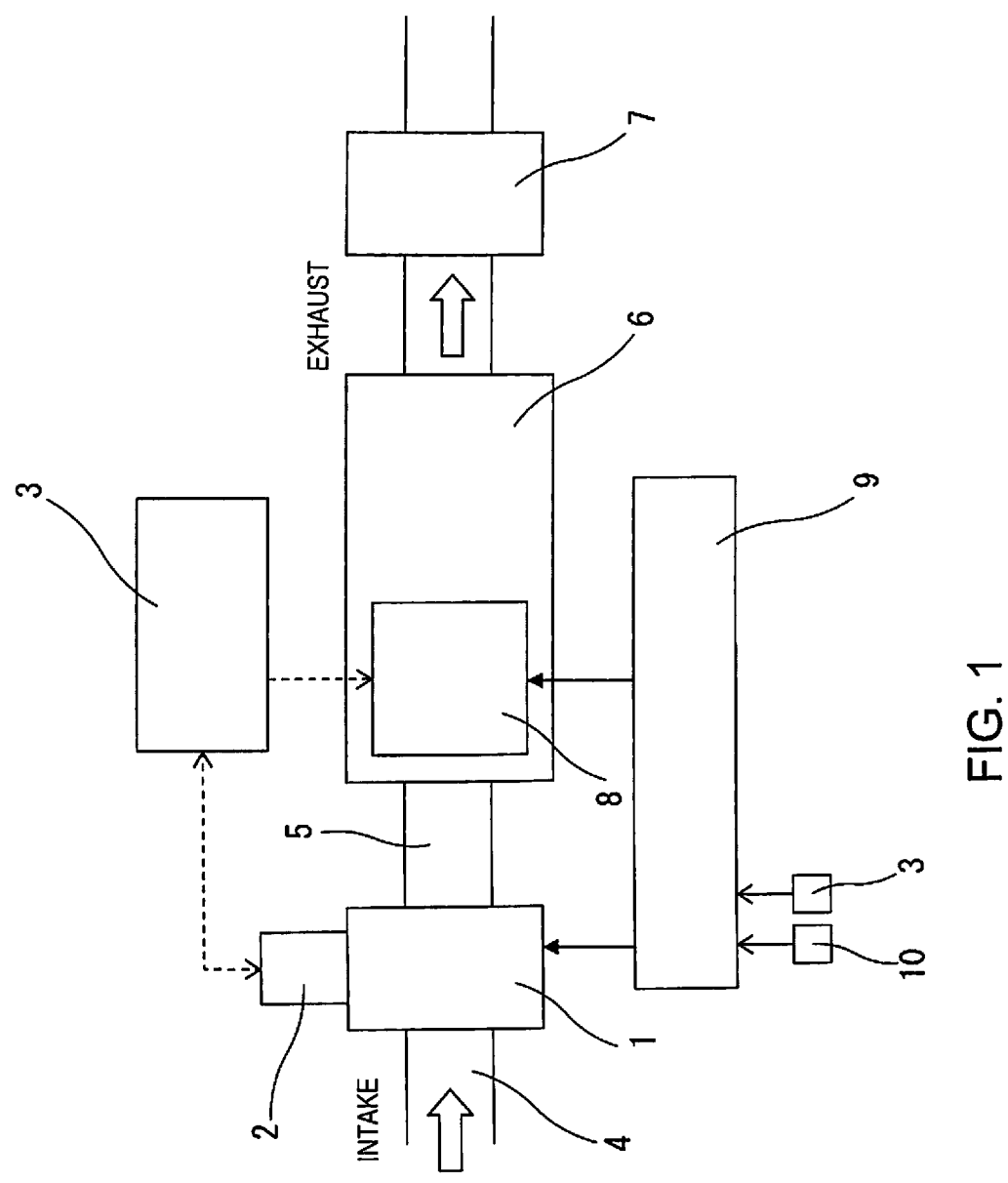
FIG. 1 is an explanatory drawing schematically depicting an outline of a system configuration of an internal combustion engine installed in a hybrid vehicle to which the present invention is applied.

FIG. 1 is an explanatory drawing schematically depicting an outline of a system configuration of an internal combustion engine 1 installed in a hybrid vehicle to which the present invention is applied.

The hybrid vehicle in which the internal combustion engine 1 is installed is a "series hybrid vehicle," which does not use the internal combustion engine 1 for motive power of the vehicle. Specifically, the internal combustion engine 1 of the present embodiment is only for power generation, and an electric motor 2 capable of generating power is linked to a crankshaft (not shown) of the engine. Electric power generated by the electric motor 2 charges a battery 3.

In the hybrid vehicle of the present embodiment in which the internal combustion engine 1 is installed, a driving electric motor (not shown) supplied with electric power from the battery 3 rotatably drives drive wheels (not shown). In other words, the hybrid vehicle in which the internal combustion engine 1 is installed is capable of traveling in EV mode, which is autonomous travel while the internal combustion engine 1 is stopped.

The electric motor 2 is composed of, for example, a synchronous motor that uses a permanent magnet for a rotor. The electric motor 2 converts rotation energy generated in the internal combustion engine 1 to electrical energy and charges the battery 3. In the hybrid vehicle of the present embodiment, for example, when a battery SOC, which is a battery charge rate of the battery 3, decreases, the internal combustion engine 1 is driven and power is generated by the electric motor 2 in order to charge the battery 3.

The electric motor 2 also has a function of driving the internal combustion engine 1, and functions as a starter motor when the internal combustion engine 1 is started. In other words, the electric motor 2 is a power-generating electric motor, and is capable of supplying generated electric power to the battery 3 and of being rotatably driven by electric power from the battery 3.

The electric power generated by the electric motor 2 is, for example, directly supplied to the abovementioned driving electric motor without charging the battery the battery 3, in accordance with a driving state. The internal combustion engine 1 may, for example, be started by a dedicated starter motor different from the electric motor 2.

An intake passage 4 and an exhaust passage 5 are connected to the internal combustion engine 1. The exhaust passage 5 is provided with a manifold catalytic converter 6 and an underfloor catalytic converter 7 serving as exhaust purification catalysts that purify exhaust discharged from the internal combustion engine 1. In other words, a plurality of exhaust purification catalysts are provided to the exhaust passage 5 of the internal combustion engine 1, and the manifold catalytic converter 6, which is one of these catalysts, is an electrically heated catalytic converter.

The manifold catalytic converter 6 is an electrically heated catalytic converter (EHC) provided with an electric heater 8, and includes, for example, a three-way catalyst. In other words, the manifold catalytic converter 6 is, for example, a three-way catalytic converter provided with the electric heater 8.

The manifold catalytic converter 6 is disposed in an engine compartment and is close to the internal combustion engine 1. The manifold catalytic converter 6 is disposed, for example, immediately downstream of a merging section of an exhaust manifold (not shown). The manifold catalytic converter 6 has a smaller capacity than the underfloor catalytic converter 7.

The manifold catalytic converter 6 has a catalyst that increases in temperature due to the electric heater 8 being energized. Energizing the electric heater 8 is controlled by a control unit 9. A supply source of electric power supplied to the electric heater 8 is the battery 3, which is charged with electric power generated by the electric motor 2.

The underfloor catalytic converter 7 is positioned downstream of the manifold catalytic converter 6; for example, the underfloor catalytic converter 7 is provided at a position underneath the floor of the vehicle, comparatively separated from the engine compartment of the vehicle. The underfloor catalytic converter 7 includes, for example, a three-way catalytic converter, and has a greater capacity than the manifold catalytic converter 6.

The control unit 9 is a universally known digital computer provided with a CPU, ROM, RAM, and an I/O interface.

The control unit 9 receives input of detection signals from various sensors, such as a catalyst temperature sensor 10 that detects a catalyst temperature of the manifold catalytic converter 6.

The control unit 9 is capable of detecting a state of charge (SOC), which is a ratio of a remaining charge to a charge capacity of the battery 3. In other words, the control unit 9 is equivalent to a battery SOC detection unit capable of detecting the battery SOC of the battery 3 installed in the hybrid vehicle.

When the hybrid vehicle travels in EV mode, the temperature of the manifold catalytic converter 6, which is an exhaust purification catalyst provided to the exhaust passage 5, decreases. When the catalyst temperature of the manifold catalytic converter 6 decreases and falls below a predetermined activation temperature, an exhaust purification rate decreases.

When the temperature of the manifold catalytic converter 6 decreases while the hybrid vehicle is traveling in EV mode, it is conceivable to start the internal combustion engine 1 and warm the catalyst with high-temperature exhaust.

However, the fuel consumption of the hybrid vehicle worsens as more time is taken to drive the internal combustion engine 1 for catalyst warming.

The time taken to drive the internal combustion engine 1 for catalyst warming can be shortened by delivering electricity from the battery 3 to the electric heater 8 of the manifold catalytic converter 6.

However, the battery SOC of the battery 3 decreases due to electricity being conducted (electric power being supplied) to the electric heater 8 of the manifold catalytic converter 6. Therefore, the internal combustion engine 1 will be driven later in order to charge the battery 3 of which the battery SOC has decreased. In other words, the fuel consumption of the hybrid vehicle generally worsens later because the internal combustion engine 1 is driven and power is generated in the electric motor 2 even if electric power is supplied to the manifold catalytic converter 6 for catalyst warming.

With a hybrid vehicle capable of traveling in EV mode, attempts are made to drive the internal combustion engine 1 and generate power at efficient driving points. Therefore, with a hybrid vehicle capable of traveling in EV mode, the electrical energy (electric power) consumed by the driving electric motor is small and the battery SOC of the battery 3 readily reaches an upper limit in scenarios where the vehicle travels at a low speed.

Therefore, when the battery SOC of the battery 3 exceeds the upper limit, the control unit 9 causes the electrical energy (electric power) of the battery 3 to be consumed and the battery SOC of the battery 3 to be reduced due to motoring by the electric motor 2 in order to protect the battery.

Accordingly, when the manifold catalytic converter 6, which is a catalytic converter above the exhaust passage 5, is warmed, the control unit 9 controls the energizing of the electric heater 8 of the manifold catalytic converter 6 or the driving of the internal combustion engine 1 in accordance with the battery SOC of the battery 3.

This makes it possible in the hybrid vehicle to warm the manifold catalytic converter 6 using the amount electric power consumed due to motoring by the electric motor 2, and generally to shorten the time taken to drive the internal combustion engine 1 for catalyst warming.

In other words, when the catalyst over the exhaust passage 5 is warmed in the hybrid vehicle, it is generally possible to minimize the worsening of fuel consumption by controlling the energizing of the manifold catalytic converter 6 and the driving of the internal combustion engine 1 in accordance with the battery SOC of the battery 3.

The control unit 9 drives the internal combustion engine 1 and causes the electric motor 2 to generate power in order to charge the battery 3 when the battery SOC of the battery 3 is low.

When the vehicle is traveling in EV mode, in which driving of the internal combustion engine 1 is stopped, and the catalyst temperature of the manifold catalytic converter 6 falls to or below a predetermined temperature (predetermined lower limit temperature) set in advance, the control unit 9 controls the energizing of the electric heater 8 (the manifold catalytic converter 6) or the driving of the internal combustion engine 1 in accordance with the battery SOC (battery charge rate) of the battery 3 in order to raise the temperature of the manifold catalytic converter 6 to a predetermined upper limit temperature, so that the manifold catalytic converter 6 becomes active. In other words, the control unit 9 is equivalent to a control unit that controls the energizing of the manifold catalytic converter 6 or the driving of the internal combustion engine 1 in accordance with the battery SOC (battery charge rate) of the battery 3.

When the battery SOC of the battery 3 is high, the control unit 9 raises the temperature of the manifold catalytic converter 6 by energizing the manifold catalytic converter 6 and driving the internal combustion engine 1.

To be specific, when the battery SOC of the battery 3 is less than a predetermined first threshold value (an SOC upper limit threshold value) and equal to or greater than a second threshold value (an SOC lower limit threshold value), the control unit 9 raises the temperature of the manifold catalytic converter 6 by energizing the electric heater 8 of the manifold catalytic converter 6 and driving the internal combustion engine 1. The first threshold value is a value greater than the second threshold value.

When there is a surplus of electrical energy stored in the battery 3 (when the battery SOC is high), the time taken to drive the internal combustion engine 1 is shortened in order to raise the temperature of the manifold catalytic converter 6, by energizing the manifold catalytic converter 6.

When energizing the electric heater 8 of the manifold catalytic converter 6, the control unit 9 can change a heat output of the electric heater 8 in accordance with the battery SOC of the battery 3. For example, when the battery SOC of the battery 3 is high, the heat output of the electric heater 8 may be greater than when the battery SOC of the battery 3 is low.

When the temperature of the manifold catalytic converter 6 is raised by energizing the electric heater 8 and driving the internal combustion engine 1, the output of the electric heater 8 may be increased if the battery SOC of the battery 3 is high, and the output of the internal combustion engine 1 may be reduced commensurately.

When the temperature of the manifold catalytic converter 6 is raised by energizing the electric heater 8 and driving the internal combustion engine 1, the output of the electric heater 8 may be reduced if the battery SOC of the battery 3 is low, and the output of the internal combustion engine 1 may be increased commensurately.

When the battery SOC of the battery 3 is low, the control unit 9 raises the temperature of the manifold catalytic converter 6 by driving the internal combustion engine To be specific, when the battery SOC of the battery 3 is less than a predetermined second threshold value, the control unit 9 raises the temperature of the manifold catalytic converter 6 by driving the internal combustion engine 1 without energizing the electric heater 8.

When the electrical energy stored in the battery 3 has decreased (the battery SOC is low), the temperature of the manifold catalytic converter 6 is raised by driving the internal combustion engine 1 without energizing the manifold catalytic converter 6.

When the battery SOC of the battery 3 is high, the control unit 9 energizes the manifold catalytic converter 6 to raise the temperature of the manifold catalytic converter 6, and causes the internal combustion engine 1 to be motored by the electric motor 2.

To be specific, when the battery SOC of the battery 3 is equal to or greater than a predetermined first threshold value, the control unit 9 energizes the manifold catalytic converter 6 to raise the temperature of the manifold catalytic converter 6, and motors the internal combustion engine 1 via the electric motor 2.

By motoring the internal combustion engine 1 via the electric motor 2, heat generated by the electric heater 8 can be efficiently transferred downstream, and the electric power of the battery 3 can be moderately consumed so that the battery SOC of the battery 3 will not be too high.

Figure 2:
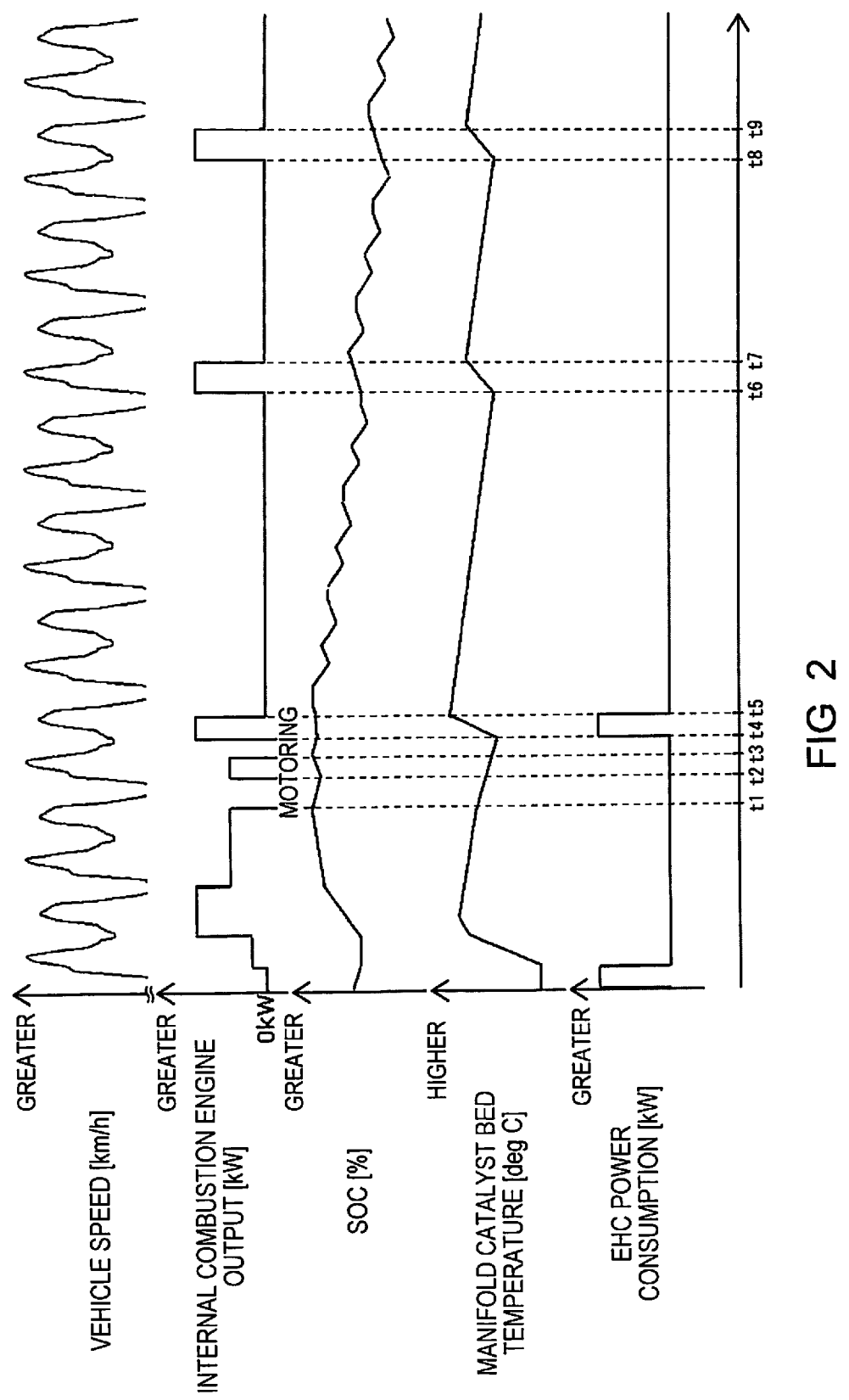
FIG. 2 is a timing chart of an example of control over energizing a manifold catalyst and driving of the internal combustion engine.

FIG. 2 is a timing chart depicting an example of control for energizing of the manifold catalytic converter 6 and driving of the internal combustion engine 1, corresponding to the battery SOC of the battery 3.

At time t1 in FIG. 2, because the battery SOC of the battery 3 exceeds the first threshold value, driving of the internal combustion engine 1 is stopped and motoring of the electric motor 2 (motoring of the internal combustion engine 1) is started.

At time t2 in FIG. 2, because the battery SOC of the battery 3 is below the first threshold value, motoring of the electric motor 2 (motoring of the internal combustion engine 1) is ended and driving of the internal combustion engine 1 is restarted.

At time t3 in FIG. 2, because the battery SOC of the battery 3 exceeds the first threshold value, driving of the internal combustion engine 1 is stopped and motoring of the electric motor 2 (motoring of the internal combustion engine 1) is started.

At time t4 in FIG. 2, because the temperature of the manifold catalytic converter 6 (BED temperature) is equal to or less than the predetermined lower limit temperature, energizing of the electric heater 8 of the manifold catalytic converter 6 is started, motoring of the electric motor 2 (motoring of the internal combustion engine 1) is ended, and driving of the internal combustion engine 1 is restarted.

At time t5 in FIG. 2, because the temperature of the manifold catalytic converter 6 (BED temperature) has reached the predetermined upper limit temperature, energizing of the electric heater 8 of the manifold catalytic converter 6 is stopped and driving of the internal combustion engine 1 is stopped.

At times t6 and t8 in FIG. 2, because the temperature of the manifold catalytic converter 6 (BED temperature) is equal to or less than the predetermined lower limit temperature but the battery SOC of the battery 3 exceeds the second threshold value, driving of the internal combustion engine 1 is restarted without energizing the electric heater 8 of the manifold catalytic converter 6.

At times t7 and t9 in FIG. 2, because the temperature of the manifold catalytic converter 6 (BED temperature) has reached the predetermined upper limit temperature, driving of the internal combustion engine 1 is stopped.

Figure 3:
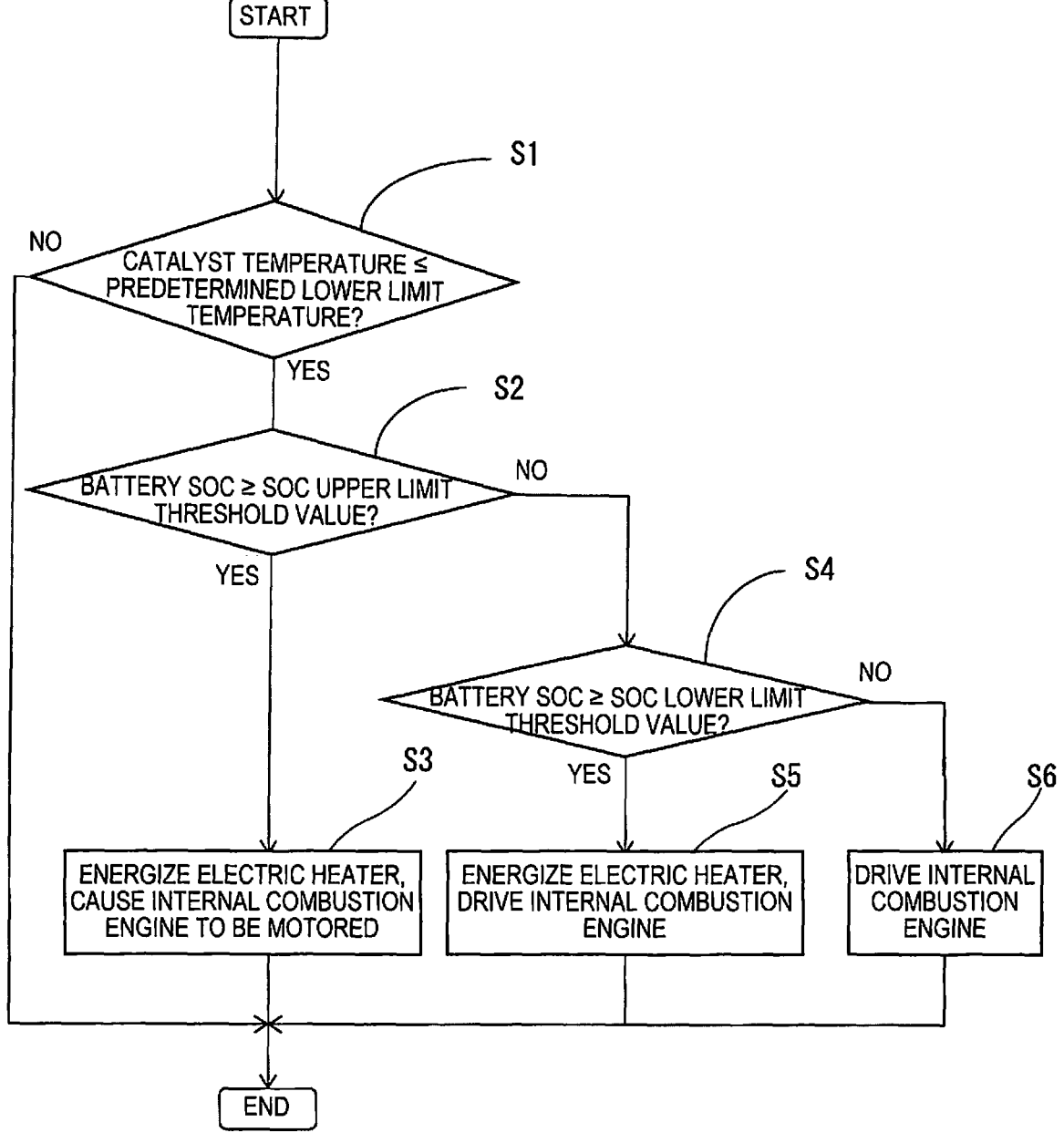
FIG. 3 is a flowchart of a flow of control for the hybrid vehicle.

FIG. 3 is a flowchart depicting a flow of control of the hybrid vehicle in the embodiment described above.

In step S1, a determination is made as to whether or not the catalyst temperature of the manifold catalytic converter 6 is equal to or less than the predetermined lower limit temperature. If the catalyst temperature is equal to or less than the predetermined lower limit temperature in step S1, the process advances to step S2.

In step S2, a determination is made as to whether or not the battery SOC of the battery 3 is equal to or greater than an SOC upper limit threshold value (first threshold value). If the battery SOC is equal to or greater than the SOC upper limit threshold value (first threshold value) in step S2, the process advances to step S3. If the battery SOC is not equal to or greater than the SOC upper limit threshold value (first threshold value) in step S2, the process advances to step S4.

In step S3, the electric heater 8 of the manifold catalytic converter 6 is energized and the internal combustion engine 1 is motored.

In step S4, a determination is made as to whether or not the battery SOC of the battery 3 is equal to or greater than an SOC lower limit threshold value (second threshold value). If the battery SOC is equal to or greater than the SOC lower limit threshold value (second threshold value) in step S4, the process advances to step S5. If the battery SOC is not equal to or greater than the SOC lower limit threshold value (second threshold value) in step S4, the process advances to step S6.

In step S5, the electric heater 8 of the manifold catalytic converter 6 is energized and the internal combustion engine 1 is driven.

In step S6, the internal combustion engine 1 is driven without energizing the electric heater 8 of the manifold catalytic converter 6.

Warming of the manifold catalytic converter 6 through the energization of the electric heater 8 and/or driving of the internal combustion engine 1 ends when the catalyst temperature of the manifold catalytic converter 6 reaches the predetermined upper limit temperature.

A specific embodiment of the present invention was described above, but the present invention is not limited to the embodiment described above; various changes can be made without deviating from the scope of the invention.

For example, the present invention can also be applied to a hybrid vehicle (e.g., a "parallel hybrid vehicle") other than the series hybrid vehicle described above if the vehicle is capable of traveling in EV mode.

The embodiment described above pertains to a method and device for controlling a hybrid vehicle.

The invention claimed is:

1. A hybrid vehicle control method for controlling a hybrid vehicle comprising an internal combustion engine having an exhaust passage, an electric motor configured to generate power by being driven by the internal combustion engine, a battery configured to be charged with electric power generated by the electric motor, and an electrically heated catalytic converter that generates heat due to being energized with electricity from the battery, the hybrid vehicle being able to travel while the internal combustion engine is stopped, the hybrid vehicle control method comprising:

controlling at least one of energization of the electrically heated catalytic converter and driving of the internal combustion engine in accordance with a battery SOC of the battery in order to increase a temperature of the electrically heated catalytic converter when a catalyst temperature of the electrically heated catalytic converter falls to or below a predetermined temperature while the hybrid vehicle is traveling, energizing the electrically heated catalytic converter to increase the temperature of the electrically heated catalytic converter and motoring the internal combustion engine using the electric motor when the catalyst temperature is equal to or below the predetermined temperature and the battery SOC of the battery is equal to or higher than a first threshold value, energizing the electrically heated catalytic converter and driving the internal combustion engine to increase the temperature of the electrically heated catalytic converter when the catalyst temperature is equal to or below the predetermined temperature and the battery SOC of the battery is lower than the first threshold value and equal to or higher than a second threshold value, the second threshold value being smaller than the first threshold value, and motoring the internal combustion engine using the electric motor without energizing the electrically heated catalytic converter to reduce the SOC of the battery when the catalyst temperature is above the predetermined temperature and the battery SOC of the battery is equal to or higher than a first threshold value.

2. The hybrid vehicle control method according to claim 1, wherein a heat output of the electrically heated catalytic converter is changed according to the battery SOC of the battery.

3. The hybrid vehicle control method according to claim 1, wherein the temperature of the electrically heated catalytic converter is increased by driving the internal combustion engine without energizing the electrically heated catalytic converter when the battery SOC of the battery is lower than the second threshold value.

4. A hybrid vehicle control device for controlling a hybrid vehicle configured to travel while an internal combustion engine having an exhaust passage is stopped, the hybrid vehicle including an electric motor, a battery, and an electrically heated catalytic converter, the electric motor being coupled to the internal combustion engine and configured to generate power by being driven by the internal combustion engine, the battery being configured to be charged with electric power generated by the electric motor, and the electrically heated catalytic converter being provided to the exhaust passage and that generates heat due to being energized with electricity from the battery, the hybrid vehicle control device comprising:

a control unit configured to control at least one of energization of the electrically heated catalytic converter and driving of the internal combustion engine in accordance with a battery SOC of the battery in order to increase a temperature of the electrically heated catalytic converter when a catalyst temperature of the electrically heated catalytic converter falls to or below a predetermined temperature while the hybrid vehicle is traveling, the control unit being further configured to energize the electrically heated catalytic converter to increase the temperature of the electrically heated catalytic converter and motor the internal combustion engine using the electric motor when the catalyst temperature is equal to or below the predetermined temperature and the battery SOC of the battery is equal to or higher than a first threshold value, energize the electrically heated catalytic converter and drive the internal combustion engine to increase the temperature of the electrically heated catalytic converter when the catalyst temperature is equal to or below the predetermined temperature and the battery SOC of the battery is lower than the first threshold value and equal to or higher than a second threshold value, the second threshold value being smaller than the first threshold value, and motor the internal combustion engine using the electric motor without energizing the electrically heated catalytic converter to reduce the SOC of the battery when the catalyst temperature is above the predetermined temperature and the battery SOC of the battery is equal to or higher than a first threshold value.

* * * * *